Sept. 10, 1935.     C. C. THOMAS     2,014,346
REFRIGERATING APPARATUS
Filed Jan. 24, 1934     3 Sheets-Sheet 1

INVENTOR.
CHARLES C. THOMAS
BY
Warren H. J. Schmieding
ATTORNEY.

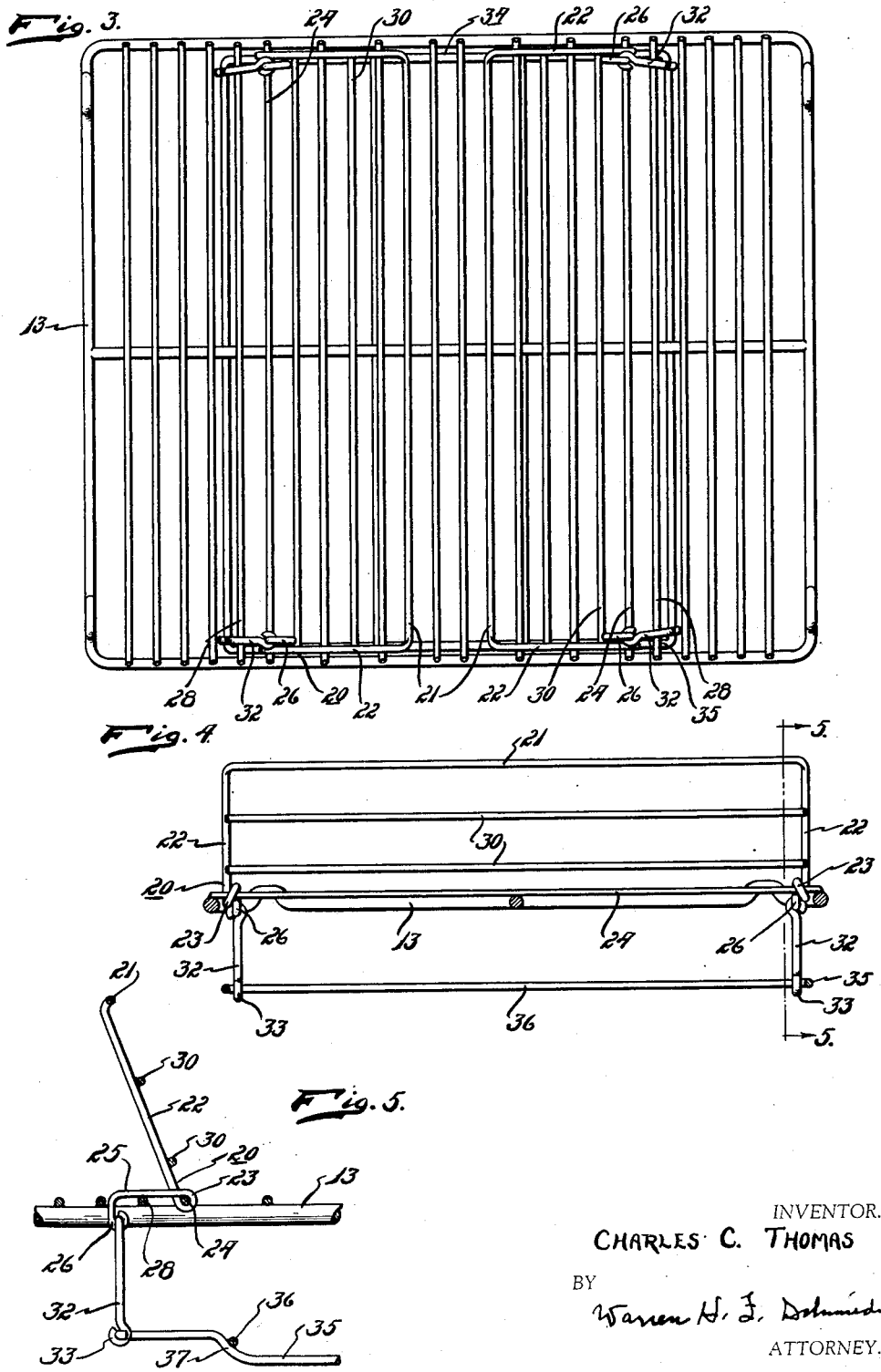

Sept. 10. 1935.  C. C. THOMAS  2,014,346
REFRIGERATING APPARATUS
Filed Jan. 24, 1934   3 Sheets-Sheet 3

INVENTOR.
CHARLES C. THOMAS
BY Warren H. F. Schmieding
ATTORNEY.

Patented Sept. 10, 1935

2,014,346

UNITED STATES PATENT OFFICE 2,014,346

REFRIGERATING APPARATUS

Charles C. Thomas, Detroit, Mich., assignor to Kelvinator Corporation, Detroit, Mich., a corporation of Michigan Application January 24, 1934, Serial No. 708,039

13 Claims. (Cl. 62—89)

The present invention relates to cabinet construction particularly to shelving for refrigerator cabinets.

In some types of refrigerator cabinets a removable drip pan is disposed in the cabinet for catching the drip from the evaporator. Usually such drip pan is disposed directly underneath the evaporator. At times it is desirable to cool, for example beverages, to a relatively cold temperature and in order to cool such beverage to the desired low temperature, the beverage is placed in the coldest part or section of the refrigerator, which section is directly below the evaporator.

One of the objects of the present invention is to provide an improved rack for a refrigerator cabinet which can be utilized for supporting a drip pan or for holding commodities, such as bottles, directly underneath the evaporator; to provide an improved rack for dependingly supporting a drip pan below the evaporator when commodities are carried on the shelf and so construct and arrange the depending support for the drip pan that it is raised out of the way when the drip pan is supported on top of the shelf.

Further objects and advantages will be apparent from the following description, reference being had to the accompanying drawings wherein preferred forms of embodiments of the present invention are clearly shown.

Fig. 3 is a top plan view of the improved rack with the parts in the position shown in Fig. 1;

Fig. 4 is a sectional view taken on line 4—4 of Fig. 2;

Fig. 5 is a sectional view taken on line 5—5 of Fig. 4;

Figure 1:
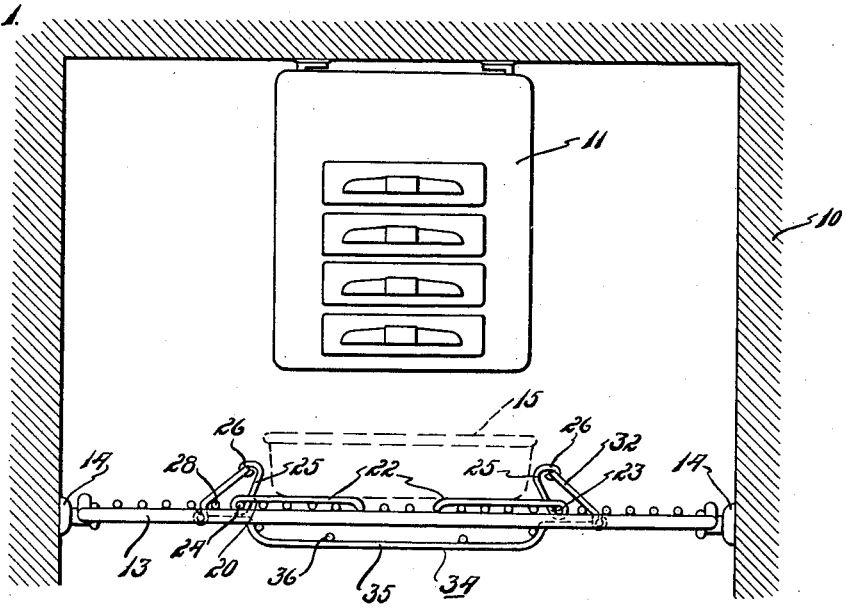
Fig. 1 is a front view of the interior of a refrigerating cabinet showing the improved rack therein and showing the refrigerating cabinet in section.
Figure 2:
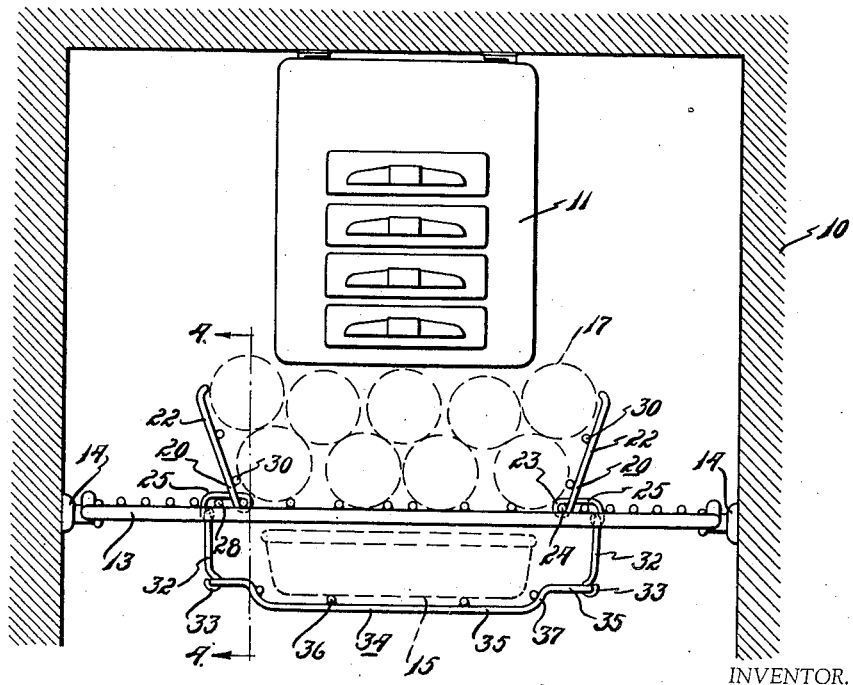
Fig. 2 is a view similar to Fig. 1 but showing the rack in a different position.
Figure 6:
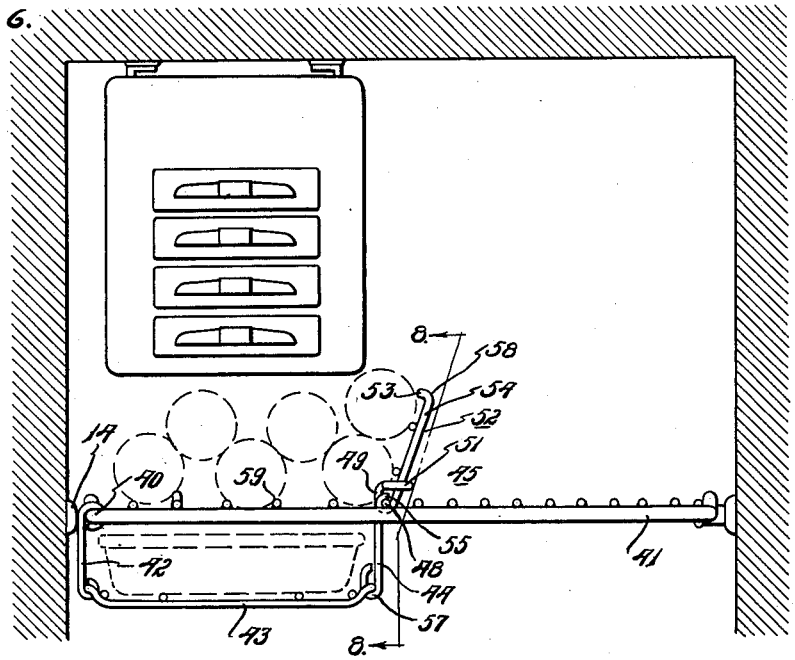
Figure 7:
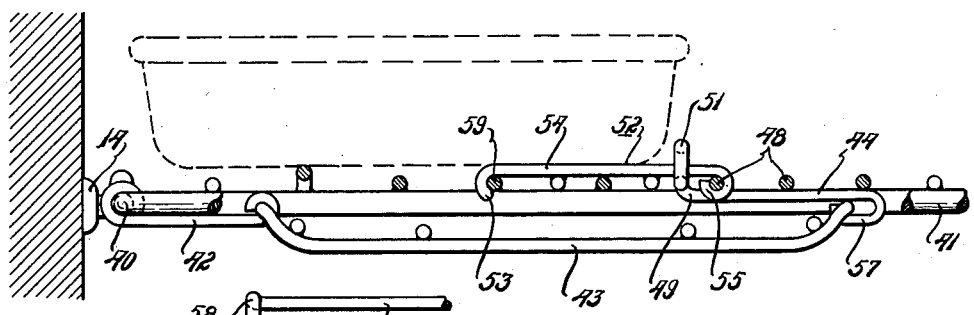
Figure 8:
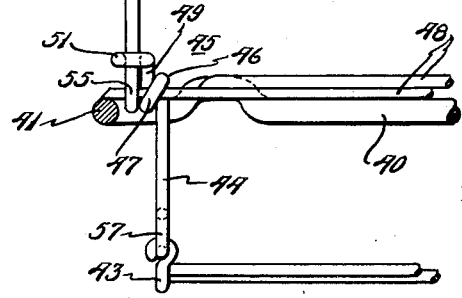

Figs. 6 and 7 are views similar to Figs. 2 and 1 respectively but showing another form of the invention; and Fig. 8 is a fragmentary side view of the rack shown in Figs. 6 and 7.

Referring to the drawings, there is shown a refrigerating cabinet 10 in which there is disposed an evaporator 11. A food shelf 13 is carried by pins 14. This food shelf is made of wire so as to permit the circulation of air therethrough.

Moisture from the air condenses on the evaporator 11 and, at times, drips therefrom and a removable drip pan is disposed directly below the evaporator for catching this drip. In Fig. 1 such drip pan is shown in dotted lines at 15 directly below the evaporator 11.

It is desirable at times to quickly cool certain commodities such as bottled beverages and one manner of accomplishing this is to place the commodity directly below the evaporator which section is the coldest part of the storage space in the refrigerator cabinet. When such commodities are confined to this section as shown in Fig. 2, it is still necessary to provide for catching the drip from the evaporator 11. In accordance with the present invention the commodities, indicated at 17 in Fig. 2, are confined to a certain section and are carried on the top of the shelf 13, and, the drip pan 15 is carried below the shelf.

In carrying out the present invention a rack or racks are provided. In Figs. 1 to 5 two racks 20 are provided and are carried by the shelf 13. These racks are formed of wire and each forms a sidepiece which sidepieces are spaced from one another. The sidepieces of each include a longitudinal run 21 which extends rearwardly and is formed integrally with transversely disposed ends 22. At the front and rear the ends 22 merge into loops 23 which surround one of the longitudinal wires 24 of the shelf 13. From the loop 23 the wire extends obliquely to the run 22 comprising an arm which is provided at its outer end with a loop 26, as clearly shown in Fig. 5. The connecting arm portions 25, between loops 23 and 26, are arranged to rest on a wire 28 of the shelf 13 and thus the wire 28 forms a stop for limiting the pivotal movement of the sidepiece in its open article receiving position. Runs of wire 30 are secured to the extensions 22 and cooperate with ends 22 and the run 21 to form a tall sidepiece and thus these racks 20 cooperate to provide a commodity retaining section as is clearly shown in Fig. 2.

The sidepieces can be swung inwardly and downwardly to the position shown in Fig. 1 so as to form a rest for the drip pan 15. When in this position, the loops 26, on the ends of arms 25, form short sidepieces or guides for guiding or limiting the sidewise movement of the drip pan 15.

The racks 20 each have associated links 32 which are connected with and depend from the loops 26 and which are provided at their lower ends with loops 33 for carrying a platform 34. This platform comprises crosswires 35 at the front and rear and a series of connecting longitudinal wires 36. The wires 35 extend downwardly as at 37 so as to form a guide for the drip pan 15 which is carried by the platform 34. The weight of the platform 34 together with the weight of the drip pan 15 thereon is sufficient to prevent the folding in of the taller or bottle retaining sidepiece when no bottles are contained between these sidepieces.

In certain types of refrigerators, the evaporator is placed adjacent a side wall of the refrigerator cabinet and in that type of cabinet the side wall of the cabinet can be utilized as a side support for the bottles. Such construction is shown in Figs. 6, 7 and 8. The rearwardly extending run 40 of the wire frame of shelf 41 carries depending links 42 at the front and rear thereof and the lower end of these links 42 pivotally carry one side of a wire platform 43. The opposite side of the platform 43 is carried by arms 44 of a rack 45. Rack 45 is formed of wire and includes two members 46 each having a loop 47 surrounding a wire strand 48 of shelf 41. An arm 49 of each member 46 extends longitudinally of arm 44 but beyond the loop 47 and is provided with a loop 51 at the end of the arm 49. The front and rear loops 51 provide a guide or a retainer for limiting the sidewise movement of drip pan 15 when it is placed above shelf 41, as shown in Fig. 7.

The rack 45 also includes a sidepiece 52 including a horizontal run 53 and transverse ends 54. Strands 56 of wire extend longitudinally and are welded to the ends 54. The ends 54 extend through the loops 51 of members 46 and at the bottom are formed into loops 55 surounding the shelf strand 48.

When the rack 45 is in the position shown in Fig. 6, the weight of the drip pan on platform 43 maintains the arms 44 and 49 of members 46 in a vertical position and therefore the loop 51 limits the sidewise movement of sidepiece 52. When the drip pan is removed and the commodities tend to move the sidepiece 52 farther to the right, the platform 43 will engage the left side of the cabinet and thus limit the movement of the sidepiece. When it is desirable to place the drip pan above shelf 41, the sidepiece is swung to the left to a horizontal position as shown in Fig. 7. The swinging movement will impart a counter-clockwise movement to members 46, through the loops 51, causing the platform to be shifted to the right and upwardly. The upper axis of links 42 is below the upper axis of arms 44 and to compensate for this difference in length of lever arms, the loops 51, which connect with the platform 43, are elongated.

The outer ends 58 of sidepiece 52 are hook shaped for the purpose of yieldingly latching the rack 45 in the position shown in Fig. 7 so that the platform 43 will not swing the sidepieces upwardly when the drip pan is removed. The wire strands of the shelf 41 are resilient and one of these strands 59 forms a latch member and the hooked ends 58 are adapted to be snapped over the strand 59 for yieldingly holding the same in its horizontal position in which position the platform 43 is raised.

From the foregoing it will be seen that I have provided a shelf which maintains commodities in the proper position and which supports a drip pan in drip receiving relation with the evaporator and when it is not desirable to place a commodity directly below the evaporator and above the shelf, the space directly below the shelf can be used for a food storage space because when the bottle retaining sidepiece or sidepieces are folded inwardly, the platform 34 is raised so that food products can be placed substantially directly below the shelf 13.

While the forms of embodiments of the present invention as herein described constitute preferred forms, it is to be understood that other forms might be adopted, all coming within the scope of the claims which follow:

I claim:
1. Refrigerating apparatus comprising in combination, a cabinet, a heat absorber disposed in said cabinet for cooling air therein, an openwork shelf disposed below the absorber, foldable means adjustable to extend above the shelf when desired and cooperating therewith to form an openwork retainer immediately below the absorber for supporting horizontally disposed bottle goods or the like.

2. Refrigerating apparatus comprising in combination, a cabinet, a heat absorber disposed in said cabinet for cooling air therein, an openwork shelf disposed below the absorber, foldable means extending above the shelf and cooperating therewith to form an openwork retainer immediately below the absorber for supporting horizontally disposed bottle goods or the like, and means depending from the shelf providing a support for a drip pan immediately below the retainer.

3. Refrigerating apparatus comprising in combination, a cabinet, a heat absorber disposed in said cabinet for cooling air therein, an openwork shelf disposed below the absorber, a rack pivotally supported by the shelf, means extending below the shelf forming a platform for a drip pan underneath the absorber, means interconnecting said platform and said rack whereby in one position of the rack said platform is retracted adjacent with the shelf, said rack having a drip pan guide portion extending upwardly when said rack is in the said position, said rack having a sidepiece disposed obliquely to the guide portion for cooling commodities between the bottom of the heat absorber and the drip pan when the rack is turned to move the platform to its extended position.

4. Refrigerating apparatus comprising in combination, a cabinet, a heat absorber disposed in said cabinet for cooling air therein, an openwork shelf disposed below the absorber, a rack pivotally supported by the shelf including an upwardly extendible sidepiece cooperable with the cabinet and shelf in one position of the rack to form an openwork retainer underneath the heat absorber, and guide means on said rack for limiting the sidewise movement of a drip pan disposed underneath the heat absorber when the rack is folded down on the shelf.

5. Refrigerating apparatus comprising in combination, a cabinet, a heat absorber disposed adjacent a side wall of said cabinet for cooling air therein, an open work shelf disposed below the heat absorber, and an adjustable rack pivotally supported upon said shelf for opening to provide an open work retainer cooperating with the shelf and the cabinet to support articles in quick cooling position under the heat absorber.

6. Refrigerating apparatus comprising in combination, a cabinet, a heat absorber disposed adjacent a side wall of said cabinet for cooling air therein, an open work shelf disposed below the heat absorber, and an adjustable rack having drip pan guide means and pivotally supported upon said shelf for opening to provide an open work retainer cooperating with the shelf and the cabinet to support articles in quick cooling position under the heat absorber or for folding to support a drip pan directly under the heat absorber.

7. Refrigerating apparatus comprising in combination, a cabinet, a heat absorber disposed adjacent a side wall of said cabinet for cooling air therein, an open work shelf disposed below the heat absorber, and an adjustable rack having drip pan guide means and pivotally supported upon said shelf for opening to provide an open work retainer cooperating with the shelf and the cabinet to support articles in quick cooling position under the heat absorber or for folding to support a drip pan directly under the heat absorber, a folding platform for supporting a drip pan under said shelf, and means interconnecting said rack and said platform whereby they may be simultaneously moved to their opened or folded positions.

8. Refrigerating apparatus comprising in combination, a cabinet, a heat absorber disposed in said cabinet for cooling air therein, an open work shelf disposed below said heat absorber, adjustable rack means on said shelf arranged to open for supporting articles for quick cooling under said heat absorber or to fold on said shelf to provide a drip pan support, a folding platform for supporting a drip pan under said shelf, and means interconnecting said rack means and said platform whereby they may be simultaneously moved to their opened or folded positions.

9. Refrigerating apparatus comprising in combination, a cabinet, a heat absorber disposed in said cabinet for cooling air therein, an open work shelf disposed below said heat absorber, adjustable rack means on said shelf arranged to open for supporting articles for quick cooling under said heat absorber or to fold on said shelf to provide a drip pan support, guides on said rack means for guiding the position of the drip pan under the heat absorber when said rack means is folded, a folding platform for supporting a drip pan under said shelf, and means interconnecting said rack means and said platform whereby they may be simultaneously moved to their opened or folded positions, said means comprising pivotal supporting means for said platform.

10. Refrigerating apparatus comprising in combination, a cabinet, a heat absorber disposed in said cabinet for cooling air therein, an open work shelf disposed below said heat absorber, and a pair of adjustable racks pivotally supported on said shelf for opening to provide an open work retainer cooperating with the shelf to support articles in quick cooling position under the heat absorber.

11. Refrigerating apparatus comprising in combination, a cabinet, a heat absorber disposed in said cabinet for cooling air therein, an open work shelf disposed below said heat absorber, and a pair of adjustable racks having drip pan guide means and pivotally supported on said shelf for opening to provide an open work retainer cooperating with the shelf to support articles in quick cooling position under the heat absorber, or for folding to support a drip pan directly under the heat absorber.

12. Refrigerating apparatus comprising in combination, a cabinet, a heat absorber disposed in said cabinet for cooling air therein, an open work shelf disposed below said heat absorber, a pair of adjustable racks having drip pan guide means pivotally supported on said shelf for opening to provide an open work retainer cooperating with the shelf to support articles in quick cooling position under the heat absorber or for folding to support a drip pan directly under the heat absorber, and a folding platform for supporting a drip pan under said shelf, and means interconnecting said racks and said platform whereby they may be simultaneously moved to their opened or folded positions.

13. Refrigerating apparatus comprising in combination, a cabinet, a heat absorber disposed in said cabinet for cooling air therein, an open work shelf disposed below said heat absorber, a pair of adjustable racks pivotally supported on said shelf for opening to provide an open work retainer cooperating with the shelf to support articles in quick cooling position under the heat absorber or for folding to support a drip pan directly under the heat absorber, and arms projecting from said pivotally supported racks for limiting the movement of the racks to opened position and projecting above the shelf to provide drip pan guides when the racks are folded.

CHARLES C. THOMAS.